US010496699B2

(12) United States Patent
Lin et al.

(10) Patent No.: US 10,496,699 B2
(45) Date of Patent: Dec. 3, 2019

(54) TOPIC ASSOCIATION AND TAGGING FOR DENSE IMAGES

(71) Applicant: ADOBE INC., San Jose, CA (US)

(72) Inventors: Zhe Lin, Fremont, CA (US); Xiaohui Shen, San Jose, CA (US); Jianming Zhang, Campbell, CA (US); Hailin Jin, San Jose, CA (US); Yingwei Li, La Jolla, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/463,757

(22) Filed: Mar. 20, 2017

(65) Prior Publication Data

US 2018/0267996 A1 Sep. 20, 2018

(51) Int. Cl.
*G06F 16/58* (2019.01)
*G06F 16/532* (2019.01)
(Continued)

(52) U.S. Cl.
CPC ........ *G06F 16/5866* (2019.01); *G06F 16/532* (2019.01); *G06F 16/951* (2019.01); *G06K 9/00684* (2013.01); *G06K 9/4628* (2013.01); *G06K 9/4676* (2013.01); *G06K 9/6248* (2013.01); *G06K 9/6273* (2013.01); *G06K 9/66* (2013.01); *G06N 3/04* (2013.01); *G06N 3/0454* (2013.01); *G06N 3/08* (2013.01); *G06T 7/33* (2017.01); *G06T 11/60* (2013.01); *G06T 2207/10016* (2013.01); *G06T 2207/20081* (2013.01); *G06T 2207/20084* (2013.01)

(58) Field of Classification Search
CPC ......... G06F 17/30268; G06F 17/30864; G06F 17/30277; G06T 7/33; G06T 11/60; G06T 2207/20084; G06T 2207/10016; G06T 2207/20081; G06N 3/04; G06N 3/08; G06K 9/66
See application file for complete search history.

(56) References Cited

U.S. PATENT DOCUMENTS 6,453,079 B1 * 9/2002 McInerny .............. G06K 9/033
382/311
2010/0313141 A1 * 12/2010 Yu ..................... G06F 17/30702
715/747

(Continued)

*Primary Examiner* — Ming Y Hon
(74) *Attorney, Agent, or Firm* — Shook, Hardy & Bacon L.L.P.

(57) ABSTRACT

A framework is provided for associating dense images with topics. The framework is trained utilizing images, each having multiple regions, multiple visual characteristics and multiple keyword tags associated therewith. For each region of each image, visual features are computed from the visual characteristics utilizing a convolutional neural network, and an image feature vector is generated from the visual features. The keyword tags are utilized to generate a weighted word vector for each image by calculating a weighted average of word vector representations representing keyword tags associated with the image. The image feature vector and the weighted word vector are aligned in a common embedding space and a heat map is computed for the image. Once trained, the framework can be utilized to automatically tag images and rank the relevance of images with respect to queried keywords based upon associated heat maps.

19 Claims, 8 Drawing Sheets

(51) Int. Cl.
  *G06F 16/951* (2019.01)
  *G06T 7/33* (2017.01)
  *G06K 9/66* (2006.01)
  *G06N 3/04* (2006.01)
  *G06N 3/08* (2006.01)
  *G06T 11/60* (2006.01)
  *G06K 9/00* (2006.01)
  *G06K 9/46* (2006.01)
  *G06K 9/62* (2006.01)

(56) References Cited

U.S. PATENT DOCUMENTS

| | | | | |
|---|---|---|---|---|
| 2011/0188742 A1* | 8/2011 | Yu | ............ | G06K 9/6218 382/159 |
| 2011/0268369 A1* | 11/2011 | Richards | ............ | G06T 5/005 382/284 |
| 2012/0087556 A1* | 4/2012 | Dai | ............ | G06K 9/0014 382/128 |
| 2012/0150531 A1* | 6/2012 | Bangalore | ............ | G06F 17/28 704/9 |
| 2013/0024507 A1* | 1/2013 | Lifshits | ............ | G06Q 50/01 709/204 |
| 2015/0178786 A1* | 6/2015 | Claessens | ............ | G06Q 30/0269 705/14.66 |
| 2015/0278642 A1* | 10/2015 | Chertok | ............ | G06N 3/02 382/156 |
| 2016/0125275 A1* | 5/2016 | Hamada | ............ | G06F 17/2785 382/229 |
| 2016/0132750 A1* | 5/2016 | Yang | ............ | G06K 9/52 382/197 |
| 2016/0188724 A1* | 6/2016 | Fergus | ............ | G06F 17/30867 707/738 |
| 2017/0103405 A1* | 4/2017 | Yonaha | ............ | G06Q 30/0203 |
| 2017/0131867 A1* | 5/2017 | Anbil Parthipan | ............ | G06F 3/04817 |

* cited by examiner

TOPIC ASSOCIATION AND TAGGING FOR DENSE IMAGES

BACKGROUND

Information searching utilizing the Internet is a widely growing practice among people young and old alike. Generally, a person wishing to gain knowledge about (or otherwise having an interest in) a particular topic or thing navigates to an online search engine and inputs a query into an appropriate query-input field. A search then is initiated on the query and a selection of search results relevant to the input query is presented for inspection by and/or enjoyment of the user. With the widespread proliferation of such query-based search practices, methods and systems for locating and presenting relevant information in response to input queries have become increasingly important. For instance, search engines desiring to become users' go-to resource for conducting on-line searches are continually refining the systems and methods they utilize to determine the relevance of potential search results to an input search query.

Another growing trend in online information searching is the search for online images in addition to, or instead of, text-based documents. Two primary methods of image search have become widely utilized. In a first method, a user inputs one or more textual keywords and images relevant to the keywords are presented in response. For instance, a user inputting the textual keyword "dog" may be presented with a plurality of images showing pictures of dogs upon conducting the keyword search. In a second method, images are utilized as the input query, for instance, when a user desires to view similar images and/or examine textual information regarding what is depicted in the input image. By way of example, a user inputting an image of "Starry Night" by Vincent Van Gogh may be presented with images of other works by Vincent Van Gogh and/or text-based information about the artist, the painting, and the like upon execution of the image search.

Whether presenting images in response to a text-based query or an image-based query, determining the relevance of particular images with respect to the queried information can be an arduous task. In some instances, users may manually associate keywords with images included in an image database and/or keywords may be extracted from information obtained in conjunction with and/or in proximity to an image. Such keywords may then be associated with the image as a keyword tag. Subsequently, when a user is searching for images utilizing a keyword that is at least similar to a keyword tag associated with a given image, the given image may be presented in response to the query. Similarly, an input image having a keyword associated with it as a keyword tag, when searched, may prompt return of other images similarly having the keyword (or a similar keyword) associated therewith as a keyword tag. Tag-based methods and systems such as these, however, often present images only tangentially related to a given query, particularly in instances where the keyword tags associated with an image are varied due to multiple items being depicted in an image.

In other instances, search systems may extract visual characteristics from a given image and attempt to match such characteristics to similar visual characteristics of images in an image database for presentation to the user in response to a query. Visual-characteristic-based methods and systems such as these similarly can present images that are only tangentially related to a given query, for instance, due to the wealth of visual information that may be included in an image, only a portion of which may be related to the input query.

The above-stated challenges are even more acute for dense images, that is, images having a high resolution or otherwise having a lot of associated information. In such instances, keywords or visual characteristics often are associated only with a small portion of an image which can lead to images in which keyword and/or visual characteristic information is less accurate than for images having relatively less associated information.

SUMMARY

Embodiments of the present invention relate to, among other things, a framework for associating visual information from dense images (i.e., images having a high resolution or otherwise having an abundance of associated information) with topics that are indicative of the subject matter of the images utilizing embedding learning. The framework is trained utilizing multiple images, each image having associated keyword tags. The keyword tags are utilized to generate a weighted word vector (or "soft topic vector") for each image (that is, a feature vector representing a dominant concept of the subject image derived from the tags) by calculating a weighted average of word vector representations generated for the tags associated with the image. Visual information associated with each image includes a number of regions. For each region of each image an image feature vector is generated. The image feature vector for each region of a given image and the weighted word vector for the image are aligned (i.e., made as close as possible to one another) into a common embedding space and a heat map is computed for the image. The heat map is visually indicative of the relevance of particular regions of the subject image with respect to certain keyword tags. The heat map includes multiple regions that correspond to the regions of the image and at least one region of the heat map corresponds to each of the tags. Once trained, the framework described herein can be utilized to automatically associate keyword tags with additional input images and to rank the relevance of images and/or image regions with respect to queried keywords based upon associated heat maps.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
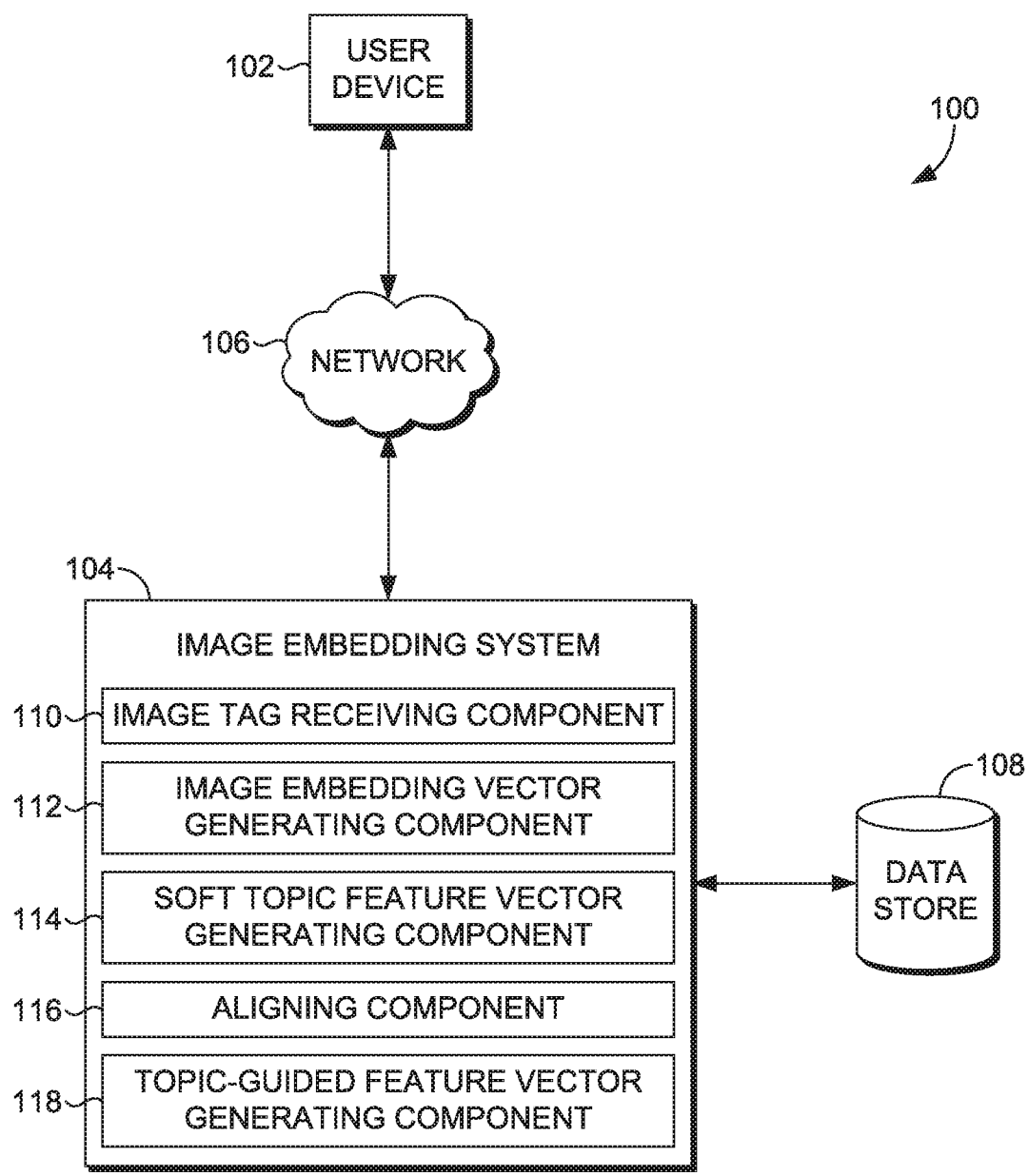
FIG. 1 is a block diagram illustrating an exemplary image-to-topic association and tagging system for dense images in accordance with some implementations of the present disclosure.

Embodiments of the present invention relate to, among other things, a framework for associating dense images (i.e., images having a high resolution or otherwise having an abundance of associated information) with topics that are indicative of the subject matter of the images utilizing embedding learning. The framework is trained utilizing multiple images, each image having associated keyword tags. The tag information associated with each image is utilized to generate a weighted word vector (or "soft topic feature vector") for each image (that is, a feature vector representing a dominant concept of the subject image derived from the tags) by calculating a weighted average of word vector representations generated for the tags associated with the image. Visual information associated with each image is divided into a number of regions. For each region of each image, one or more visual features are computed, an image feature vector is generated from the visual features, and an image embedding vector is generated from the image feature vector. The image feature vector for each region of a given image and weighted word vector for the image are aligned (i.e., made as close as possible to one another) into a common embedding space and a heat map is computed for the image. The heat map is visually indicative of the relevance of particular regions of the subject image with respect to certain keyword tags. The heat map includes multiple regions that correspond to the regions of the image and at least one region of the heat map corresponds to each of the tags. Once trained, the framework described herein can be utilized to automatically tag additional input images and rank the relevance of images and/or image regions with respect to queried keywords based upon associated heat maps.

Various terms are used throughout this description. Definitions of some terms are included below to provide a clearer understanding of the ideas disclosed herein:

A "convolutional neural network" is a feed-forward neural network that can make use of the internal structure of data (such as the two-dimensional structure of image data) through convolution layers, where each computation unit responds to a small region of input data (e.g., a small region of a large image). In convolutional neural networks, small regions of data are converted to vectors with information relevant to the task being preserved, the vectors for use in upper layers. That is, through training, a convolution layer learns an embedding of small regions of data.

"Embedding" refers to a structure-preserving function, in particular, a function that generates low-dimensional features that preserve the predictive structure.

"Visual characteristic" refers to a visual trait, quality or property of an image.

"Keyword tag" as utilized herein refers to a Meta element associated with an image that includes a word or concept associated with the image. Keyword tags can include common misspellings and synonymous terms. Keyword tags can be extracted from visual characteristics of an image and/or can be manually provided by a user.

"Visual Feature" as utilized herein refers to discrete visual information capable of being computed from an image that can be low-level (e.g., lines, curves, etc.) and/or high-level (such as shapes, body parts, and the like). Such computation may be performed, for instance, utilizing a convolutional neural network.

Traditional approaches to online image search are constrained in their ability to adequately identify and present the most relevant images available in response to an input query. Whether presenting images in response to a text-based query or an image-based query, refining the methods and systems for determining the relevance of particular images with respect to the queried information is an on-going undertaking for search engines and other entities that employ online search functionality. Metadata-keyword-tag-based methods and systems often present images only loosely related to a given query, particularly in instances where the keyword tags associated with an image are varied due to multiple items being depicted in an image. Similarly, visual-characteristic-based methods and systems can present images that are only loosely related to a given query, for instance, due to the wealth of visual information that may be included in an image, only a portion of which may be related to the input query. These challenges can be even more acute for dense images, where keywords or visual characteristics often are associated only with a small portion of an image which can lead to images in which keyword and/or visual characteristic information is less accurate than for images having relatively less information associated therewith.

Various embodiments of the present invention address the technical challenge of appropriately identifying and presenting the most relevant images available in response to an input search query by providing an approach that facilitates associating dense images with topics that are indicative of the subject matter of the images utilizing embedding learning. During a training phase, multiple dense images are received, each image having associated visual characteristics and keyword tags. In some embodiments, the keyword tags are user-provided. As to the visual characteristics associated with the images, each dense image includes a number of regions. Each region encompasses less than the entire image and a sum of the regions encompasses the entire image. For each region of each image, one or more visual features are computed, the visual features are utilized to create an image feature vector for each image. On the keyword side, during the training phase, the keyword tags are utilized to create an image-specific soft topic feature vector (or weighted word vector). More particularly, a word vector representation is generated for each keyword tag associated with an image and a weighted average of the generated word vector representations is calculated to generate a soft topic feature (or weighted word) vector for the image, i.e., a feature vector that is representative of a dominant concept among the keyword tags. The image embedding for each image region and the soft topic feature vector are aligned (that is, made as close as possible to one another) into a common embedding space and a heat map is computed for the image. The heat map is visually indicative of the relevance of particular regions of the subject image with respect to certain keyword tags. The heat map includes regions that correspond to the regions of the image and at least one region of the heat map corresponds to each of the tags.

Once the framework is trained, an auto-tagging functionality of the framework can be utilized to predict a list of keyword tags and an associated heat map for an input image. Similarly, and by way of reverse application, heat maps generated by the image auto-tagging system can be utilized to build a search engine for identifying images relevant to an input search query, be it a text-based or image-based query.

With reference now to the drawings, FIG. 1 is a block diagram illustrating an exemplary system 100 for dense image-to-topic association and keyword tagging in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with an image embedding system 104 to associate dense images with topics indicative of the subject matter contained therein utilizing embedding learning. Each of the components shown in FIG. 1 can be provided on one or more computer devices, such as the computing device 800 of FIG. 8, discussed below. As shown in FIG. 1, the user device 102 and the image embedding system 104 can communicate via the network 106, which may include, without limitation, one or more local area networks (LANs) and/or wide area networks (WANs). Such networking environments are commonplace in offices, enterprise-wide computer networks, intranets, and the Internet. Accordingly, the network 106 is not further described herein. It should be understood that any number of user devices and image embedding systems may be employed within the system 100 within the scope of implementations of the present disclosure. Each may comprise a single device or multiple devices cooperating in a distributed environment. For instance, the image embedding system 104 could be provided by multiple server devices collectively providing the functionality of the image embedding system 104 as described herein. Additionally, other components not shown may also be included within the network environment.

The image embedding system 104 has access to a data store 108. In implementations of the present disclosure, the data store 108 is configured to be searchable for one or more of the items stored in association therewith. It should be understood that the information stored in association with the data store 108 may be configurable and may include any information relative to, by way of example only, images, keyword tags, soft topics, visual features, image vectors, heat maps, and the like. The content and volume of such information are not intended to limit the scope of aspects of the present technology in any way. Further, the data store 108 may be a single, independent component (as shown) or a plurality of storage devices, for instance, a database cluster, portions of which may reside in association with the image embedding system 104, another external computing device (not shown), and/or any combination thereof. Additionally, the data store 108 may include a plurality of unrelated data stores within the scope of embodiments of the present technology.

The image embedding system 104 is generally configured to receive images from a user device, such as the user device 102, and associate such dense images with topics that are indicative of the subject matter contained therein utilizing embedding learning. The user device 102 can access and communicate with the image embedding system 104 via a web browser or other application running on the user device 102. The image embedding system 104 includes an image/tag receiving component 110 configured to receive a plurality of images for image-to-topic association and tagging. The image receiving component 110 is configured to receive images that include one or more keyword tags associated therewith (for instance, user-provided keyword tags) for purposes of training the image embedding system 104. The image receiving component 110 also is configured to receive images void of associated keyword tags, for instance, for purposes of associating keyword tags based upon comparison to other images and/or identifying similar images.

The image embedding system 104 also includes an image embedding vector generating component 112. The image embedding vector generating component 112 is configured to compute one or more visual features from an image, generate a fixed-dimensional image feature vector from the one or more visual features, and generate an embedding vector from the image feature vector utilizing a convolutional neural network. Convolutional neural networks were described herein above and are known to those having ordinary skill in the relevant art. Accordingly, convolutional neural networks are not further described herein. In accordance with embodiments of the present invention, an image embedding vector may be associated with an image as a whole or with a region of an image that comprises less than the entire image.

Further, the image embedding system 104 includes a soft topic feature vector generating component 114. The soft topic feature vector generating component 114 is configured to generate a word vector representation for each of a plurality of keyword tags associated with an image, and calculate a weighted average of the generated word vector representations to generate a soft topic feature vector. A soft topic feature vector represents a rough summary of the keyword tags associated with an image and exists in a continuous word vector space.

The image embedding system 104 also includes an aligning component 116. The aligning component 116 is configured to align (that is, render as close as possible to one another) an image feature vector and a soft topic feature vector to compute a heat map corresponding to the image. In accordance with embodiments of the present invention, the image feature vector is associated with a region of an image that comprises less than the entire image. The soft topic feature vector is image-specific. The heat map is visually indicative of the relevance of particular regions of the subject image with respect to certain keyword tags and includes a plurality of regions that correspond to a plurality of regions of the image. At least one region of the heat map corresponds to each of the keyword tags.

The image embedding system 104 additionally includes a topic-guided feature vector generating component 118. The topic-guided feature vector generating component 118 is configured to pool a local feature vector from a vector map, concatenate the local feature vector with a soft topic feature vector form a topic-guided feature vector. The topic-guided feature vector then can be utilized to generate a second image embedding vector and to compute a second heat map corresponding to an image by aligning the second image embedding vector with the soft topic feature vector into the common embedding space, for instance, utilizing cosine similarity loss.

In accordance with implementations of the present disclosure, once the framework is trained, an auto-tagging functionality of the framework can be utilized to predict a list of keyword tags and an associated heat map for an input image. Similarly, and by way of reverse application, heat maps generated by the image auto-tagging system can be utilized to build a search engine for identifying images relevant to an input search query, be it a text-based or image-based query. In embodiments, a scoring function $f: \mathbb{I} \times \mathbb{W} \rightarrow \mathbb{R}$ is learned, where $\mathbb{I}$ is the image space, $\mathbb{W}$ is the tag dictionary, and $f(I, w)$ quantifies the relevancy between image $I \in \mathbb{I}$ and tag $w \in \mathbb{W}$. After learning the scoring function $f$, for a given image $I \in \mathbb{I}$, the auto-tagging system utilizes $f(I, w)$ to predict keyword tags by sorting $w \in \mathbb{W}$. For a query text $w \in \mathbb{W}$, a text-based image search engine utilizes $f(I, w)$ to sort images $(I_1, I_2, \ldots I_n) \in \mathbb{I}$.

Figure 2:
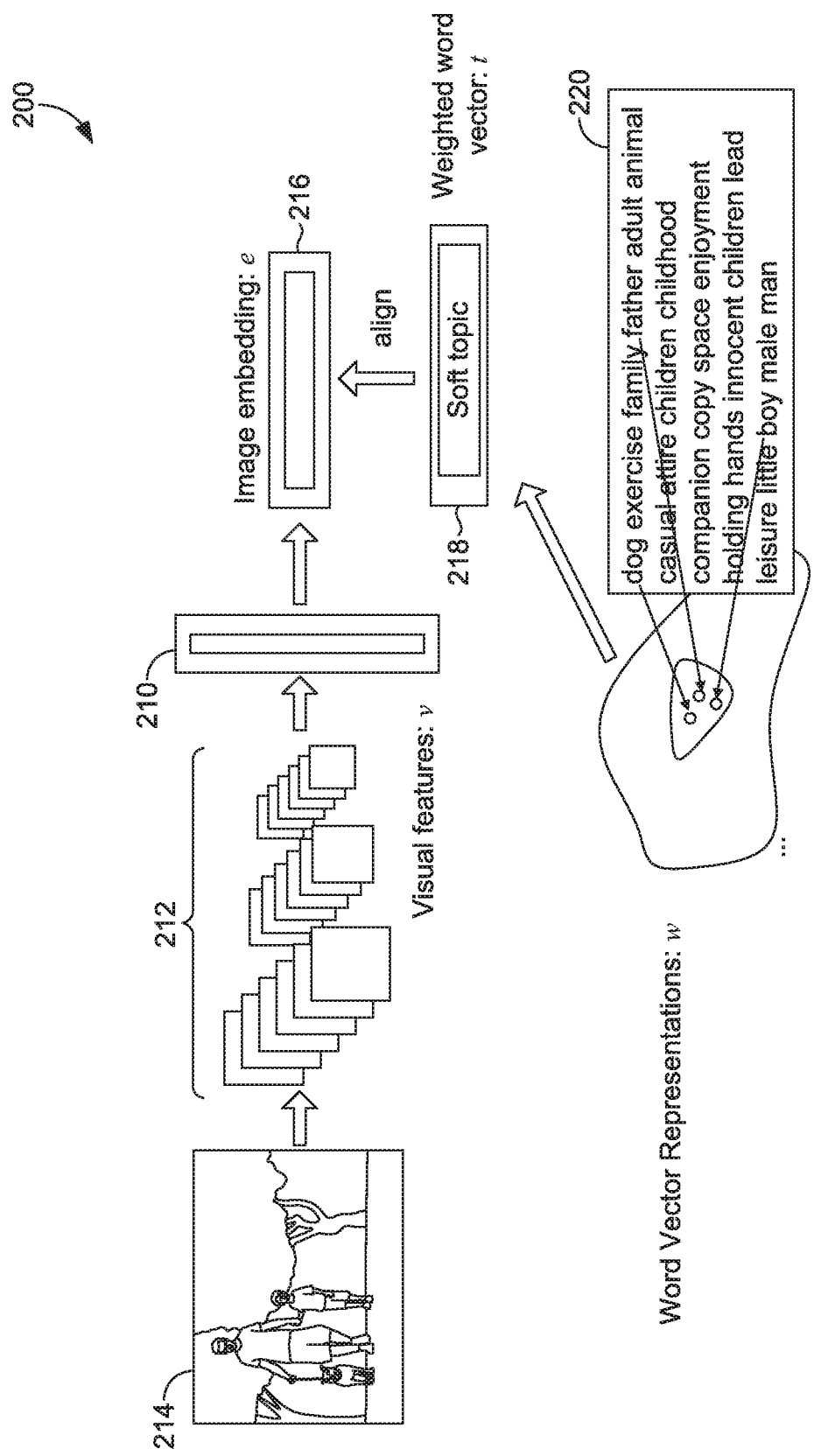
FIG. 2 is a schematic diagram illustrating an exemplary dense image-to-topic association and keyword tagging system in accordance with some implementations of the present disclosure.

Implementations of the present disclosure utilize an image-to-topic embedding approach. A schematic diagram illustrating an exemplary overall embedding learning framework 200 in accordance with implementations of the present disclosure is shown in FIG. 2. The framework 200 is generally configured to create image feature vectors 210 from visual features 212 computed from images 214, create image embeddings 216 from image feature vectors 210, create soft topic feature vectors 218 from keyword tags 220 associated with images, and to align the image embeddings 216 and the soft topic feature vectors 218 utilizing embedding learning. The training set is denoted as $\mathcal{D} = \{(I,(w_1, w_2, \ldots, w_n))\}$, where I is an image and $w_i$ is its associated keyword tags, for instance, provided by a user. To exploit keyword tag correlation, a word vector representation is used for $w_i$. An embedding network is learned to map the image to an embedding space as e=embed_net(I), where $e \in \varepsilon = \mathbb{R}^D$ with dimension D. Then the similarity score between I and w can be directly measured in this space by:

$$f_{embed}(I, w) = \langle \text{embed\_net}(I), w \rangle \quad \text{(Equation 1)}$$
$$= \langle e, w \rangle$$
$$= \frac{e^T w}{\|e\|\|w\|},$$

for all $w \in \mathbb{W}$.

In accordance with implementations of the present disclosure, Pointwise Mutual information (PMI) is utilized to represent tags $w \in \mathbb{W}$ as word vectors. As known to those having ordinary skill in the relevant art, PMI is a measure of association that is utilized in information theory and statistics. It is calculated as:

$$M = PMI(w_i, w_j) = \frac{\log p(w_i, w_j)}{\log p(w_i) \log p(w_j)} \quad \text{(Equation 2)}$$

Thus the matrix M is of size V×V, where V is size of tag dictionary $\mathbb{W}$ and M accounts for the co-occurrences of tags in the training corpus. Eigen vector decomposition is then applied to decompose the matrix M as $M = USU^T$. Let $W = US^{-1/2}$, then each row of the column-truncated submatrix $W_{:,1:D}$ is used as the word vector representation for all V tags. In accordance with exemplary implementations hereof, D is set to 4096. PMI is known to those having ordinary skill in the relevant art and, accordingly, is not further described herein.

After obtaining word vector representations for each tag, an encoding scheme for the set of user-provided keyword tags $(w_1, w_2, \ldots, w_n)$ associated with a given image is calculated. In accordance with exemplary implementations of the present disclosure, a soft topic t is generated as a weighted average of the set of word vectors. The following equation is utilized:

$$t = \sum_{i=1}^{n} \alpha_i w_i \quad \text{(Equation 3)}$$

wherein t represents the soft topic feature vector, i=1 represents the subject image, $w_i$ represents the subject tag, n represents a quantity of tags, and $\alpha_i$ represents a weighting function.

This encoding scheme is referred to herein as a "soft topic." A soft topic is a coarse summary of the user-provided tags and it lives in a continuous word vector space. Soft topics generated in accordance with implementations hereof permit discovery of one or more dominant concepts in the set of keyword tags, enabling the system to be robust to "noisy" annotations, that is, annotations having limited useful information with respect to an image.

Several choices of weighting function $\alpha_i$ may be utilized in accordance with implementations of the present disclosure. By way of example only, $\alpha_i$ may be calculated uniformly, providing all keyword tags with an equal weight. By way of another example, $\alpha_i$ may be calculated utilizing tag order. Tag order assumes that tags provided by a user are provided in a time-order having some correlation to their relevance to the image. Thus, a first keyword tag is assigned a greater weight than a second tag when the first tag is provided before the second tag. By way of yet another example, $\alpha_i$ may be calculated utilizing Inverse Document Frequency (IDF). With IDF, the more frequently a particular tag is associated with any image in a dataset of images, the less weight it is afforded. However, the rarer a keyword tag is, the higher weight it is afforded. It will be understood and appreciated by those having ordinary skill in the art that the weighting schemes described herein are offered by way of example only. Any number of weighting schemes may be utilized in accordance with implementations of the present disclosure. Any and all such variations, and any combination thereof, are contemplated to be within the scope of embodiments of the present invention.

Figure 3:
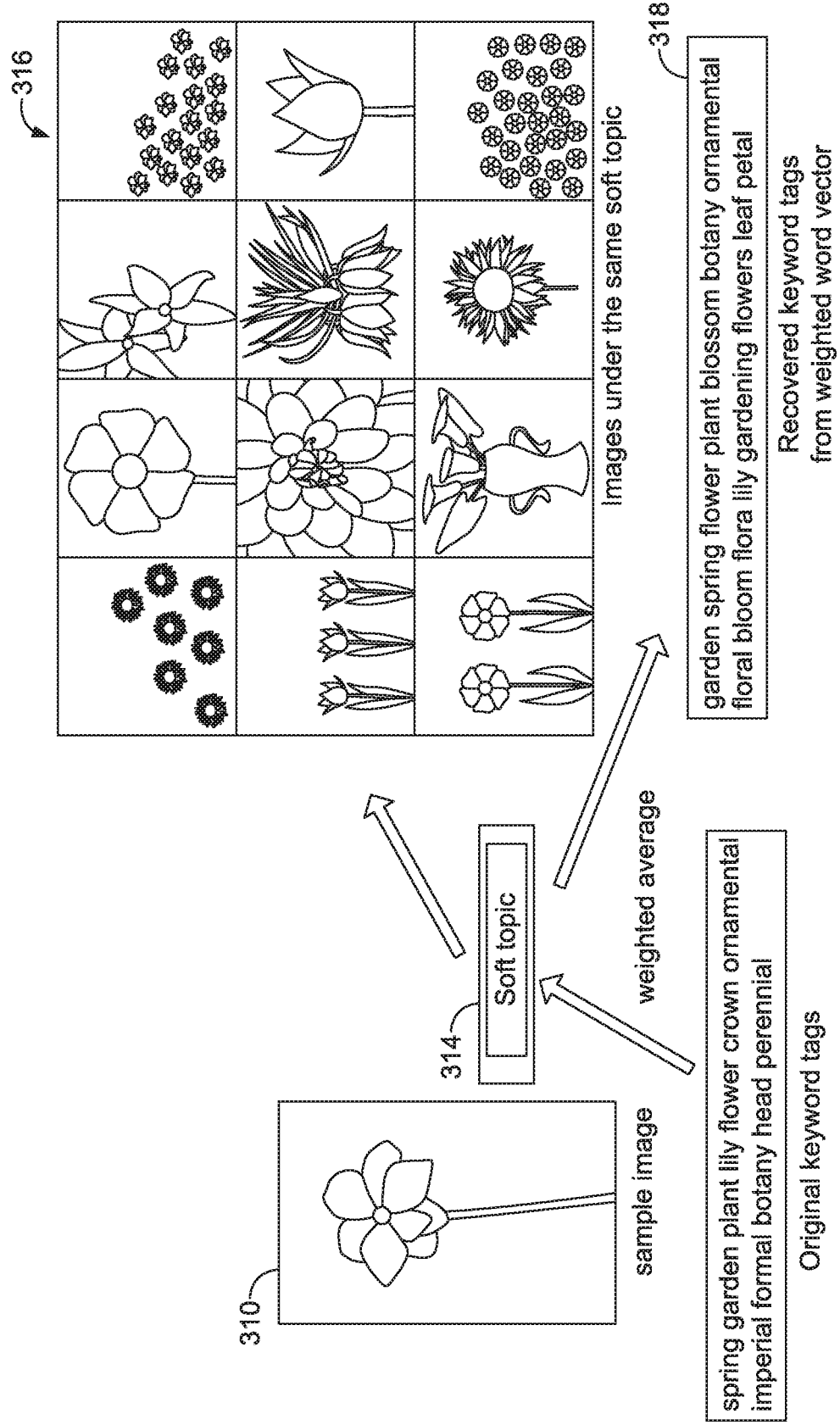
FIG. 3 is a schematic diagram illustrating exemplary search results returned for an input image utilizing an image-to-topic association system in accordance with some implementations of the present disclosure.

An exemplary soft topic is illustrated in the schematic diagram of FIG. 3. For the sample image 310 and the original keyword tags 312, a soft topic feature vector 314 is formed by Equation 3. The soft topic feature vector 314 then is used to retrieve images 316 in the dataset with similar soft topic feature vectors. It can be seen that the retrieved images 316 are all under the topic "garden/flower" and the recovered keyword tags 318 from the soft topic feature vector 314 are similar, and in some instances identical, to the original keyword tags 312.

In addition to keyword tags, images in the dataset include a plurality of visual characteristics as well. In accordance with implementations of the present invention, visual features are computed from the visual characteristics. Visual features may include, by way of example only, lower level features such as lines, curves, etc., and/or higher level features such as shapes, body parts (human or otherwise), and the like. In implementations, the visual features are computed utilizing a convolutional neural network, a deep network functionality known to those having ordinary skill in the relevant art. From the visual features, an N-dimensional image feature vector (i.e., a fixed-dimensional feature vector where N=a positive integer) is generated from the one or more visual features.

Figure 4:
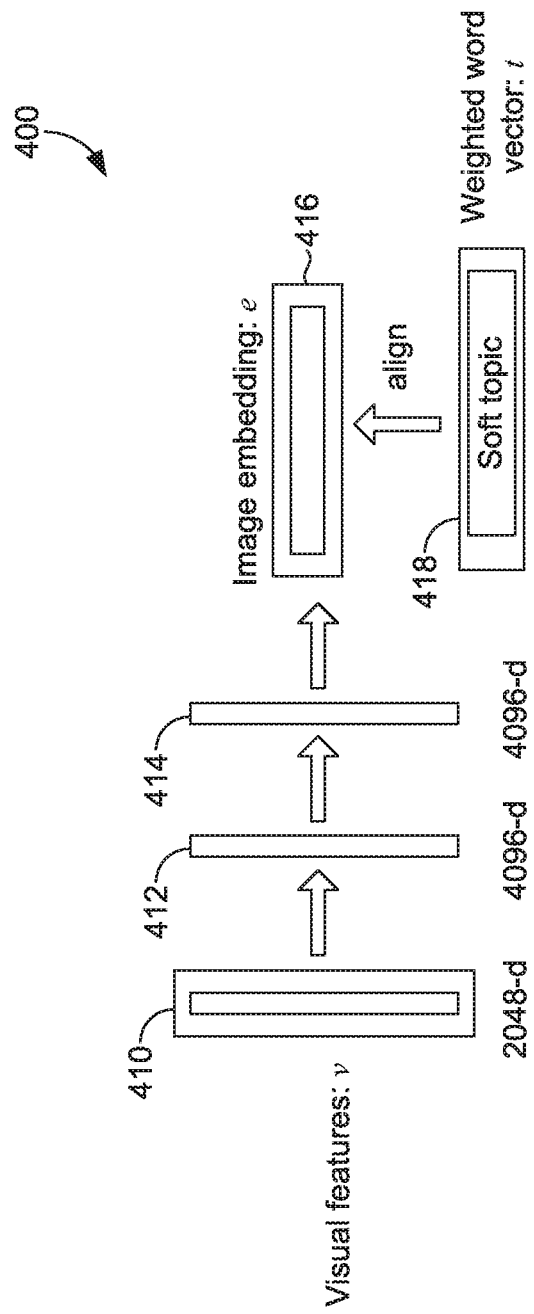
FIG. 4 is a flow diagram illustrating an exemplary method for dense image-to-topic association and keyword tagging in accordance with some implementations of the present disclosure.

A convolutional neural network then is employed to map the image feature vector and the soft topic feature vector into a common embedding space ε. More specifically, each image I is passed through a residual network and the penultimate layer is extracted and used as image feature vector v. An exemplary embedding network 400 is shown in FIG. 4. The illustrated embedding network 400 is a three-layer 410, 412, 414 fully-connected convolutional neural network with each fully-connected layer followed by a batch normalization layer and ReLU non-linear activation layer. Convolutional neural networks and the illustrated layers and their functionality are known to those having ordinary skill in the relevant art and, accordingly, are not further described herein.

The image embedding e 416 and the soft topic feature vector t 418 are aligned, for instance, with a cosine similarity loss:

$$\text{embed\_loss}(e, t) = 1 - \langle e, t \rangle \quad \text{(Equation 4)}$$
$$= 1 - \frac{e^T t}{\|e\|\|t\|}$$

Figure 5:
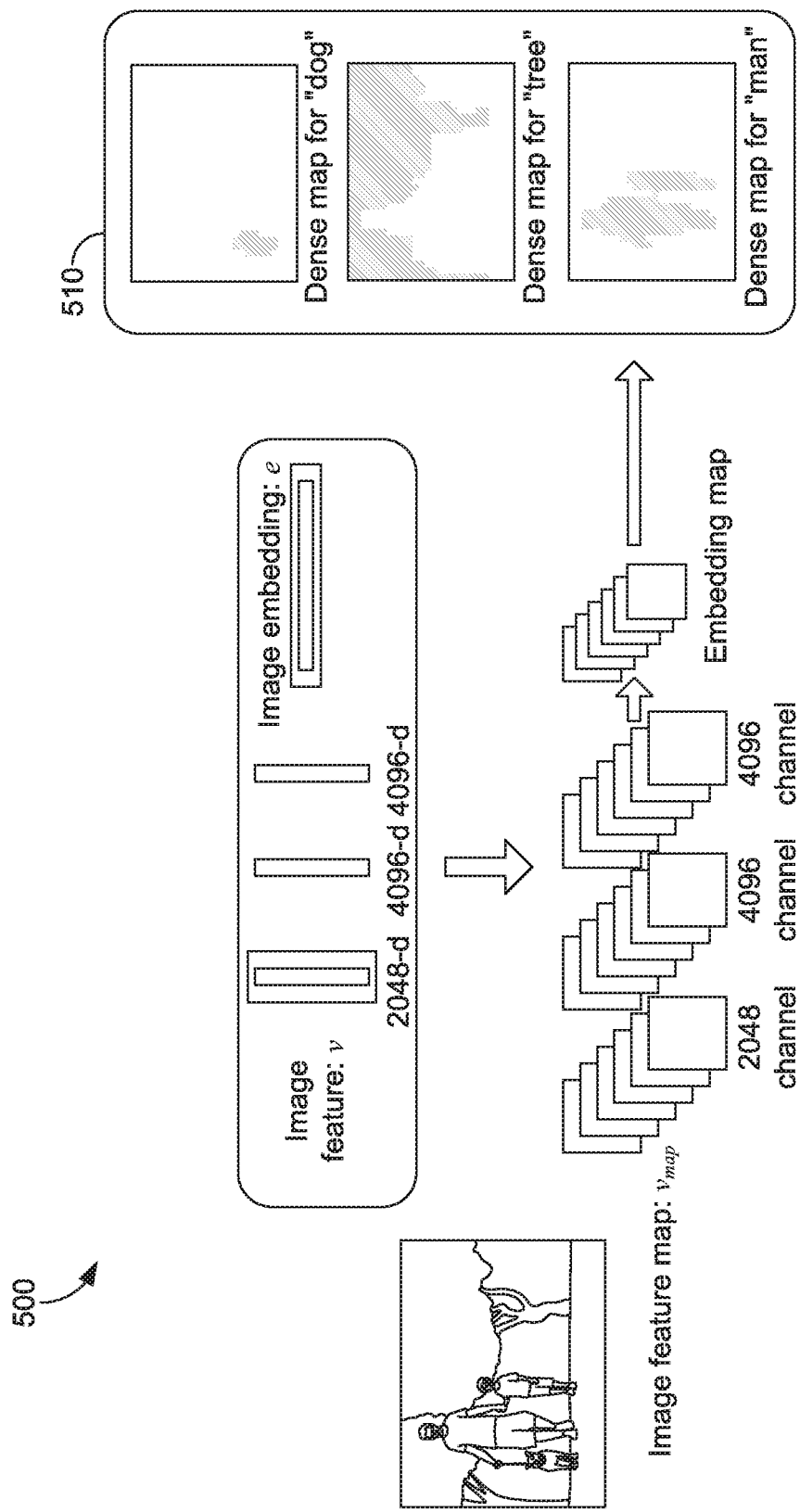
FIG. 5 is a schematic diagram illustrating an exemplary network for embedding learning utilizing soft topics in accordance with some implementations of the present disclosure.

When associating topics and tagging dense images (that is, images having a high resolution or otherwise having an abundance of associated information), tags and their relevance, as indicated by an image-specific heat map, is performed for each region of a subject image. Dense tagging attempts to predict tags and their relevancy score for each region of an image. As shown FIG. 5, the embedding learning framework 500 (previously illustrated as network 200 in FIG. 2) is transformed to a fully-convolution network by viewing the fully connected weights as 1×1 convolution kernels and the batch normalization layers as spatial batch normalization layers. "1×1 convolution kernels" are filters used in the convolution layer. The filter size is 1×1×C where C represents the number of channels. "Batch normalization layers" are a kind of feature normalization layer that makes network training faster and more stable. Convolution kernels and batch normalization layers are known to those having ordinary skill in the art and, accordingly, are not further described herein. After this transformation, the output is a set of heat maps 510, each heat map corresponding to a different keyword tag.

Figure 6:
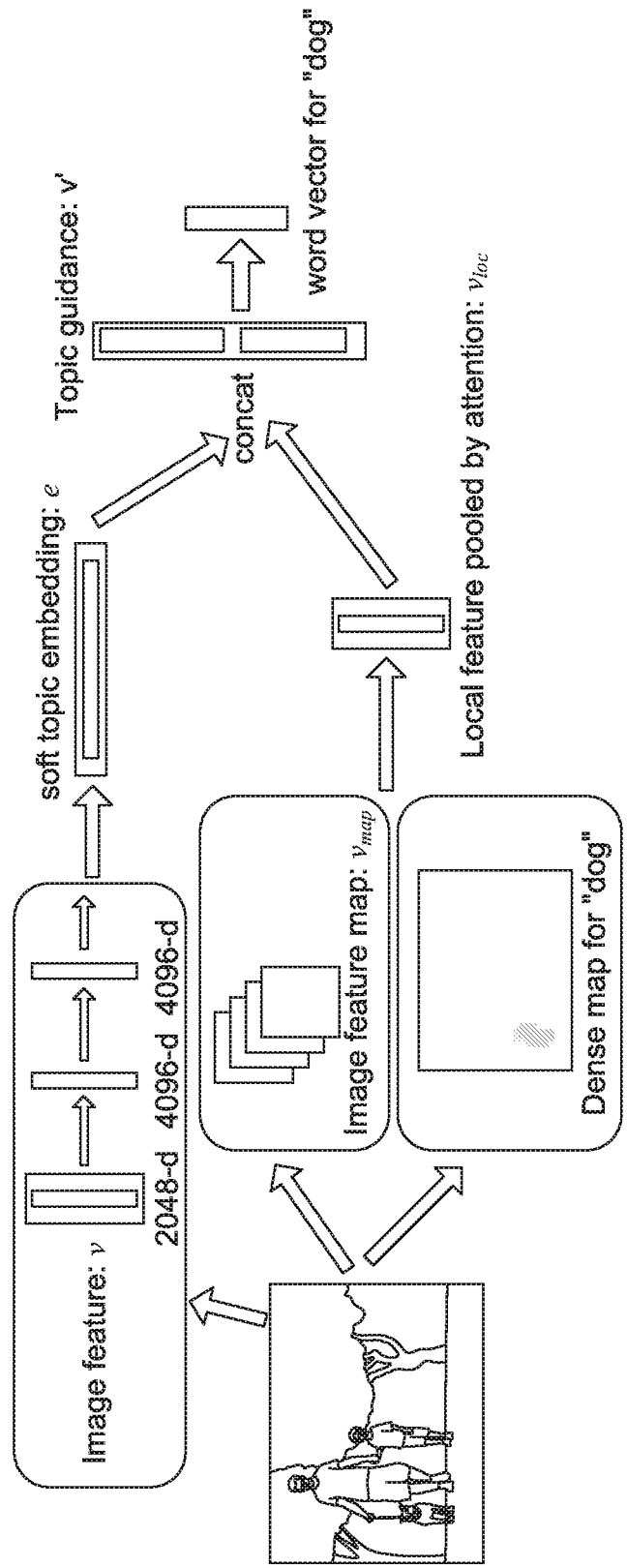
FIG. 6 is a schematic diagram illustrating dense image-to-topic association and keyword tagging utilizing a fully convolutional network in accordance with some implementations of the present disclosure.

Up to now, the embedding learning is still coarse in the semantic space in the sense that each age is embedded to a coarse soft topic vector. To boost specificity of keyword tag prediction, in accordance with implementations of the present disclosure, a second round of image-to-tag embedding learning may be performed under topic guidance. In this instance, the embedding is to embed a specific region of the image to a specific tag instead of soft topic. The system pipeline is illustrated in FIG. 6.

The dense tagging system is used to generate the heat map h(i, j) for a user provided tag w. Then a local feature vector is pooled from the feature map $v_{map}$ as:

$$v_{loc} = \sum_{i,j} h(i, j) v_{map}(i, j) \quad (11)$$

Then the local feature vector is concatenated with the image embedding vector e for one of the regions of the image form the topic-guided feature vector v':

$$v' = \text{concat}(v_{loc}, e) \quad (12)$$

Finally, a new image-to-tag embedding is generated (i.e., a second image embedding vector): e'=embed_net(v') and aligned with the soft topic feature vector. The learning is again supervised by a cosine similarity loss:

$$\text{embed\_loss}(e', t) = 1 - \langle e', t \rangle \quad (13)$$

Figure 7:
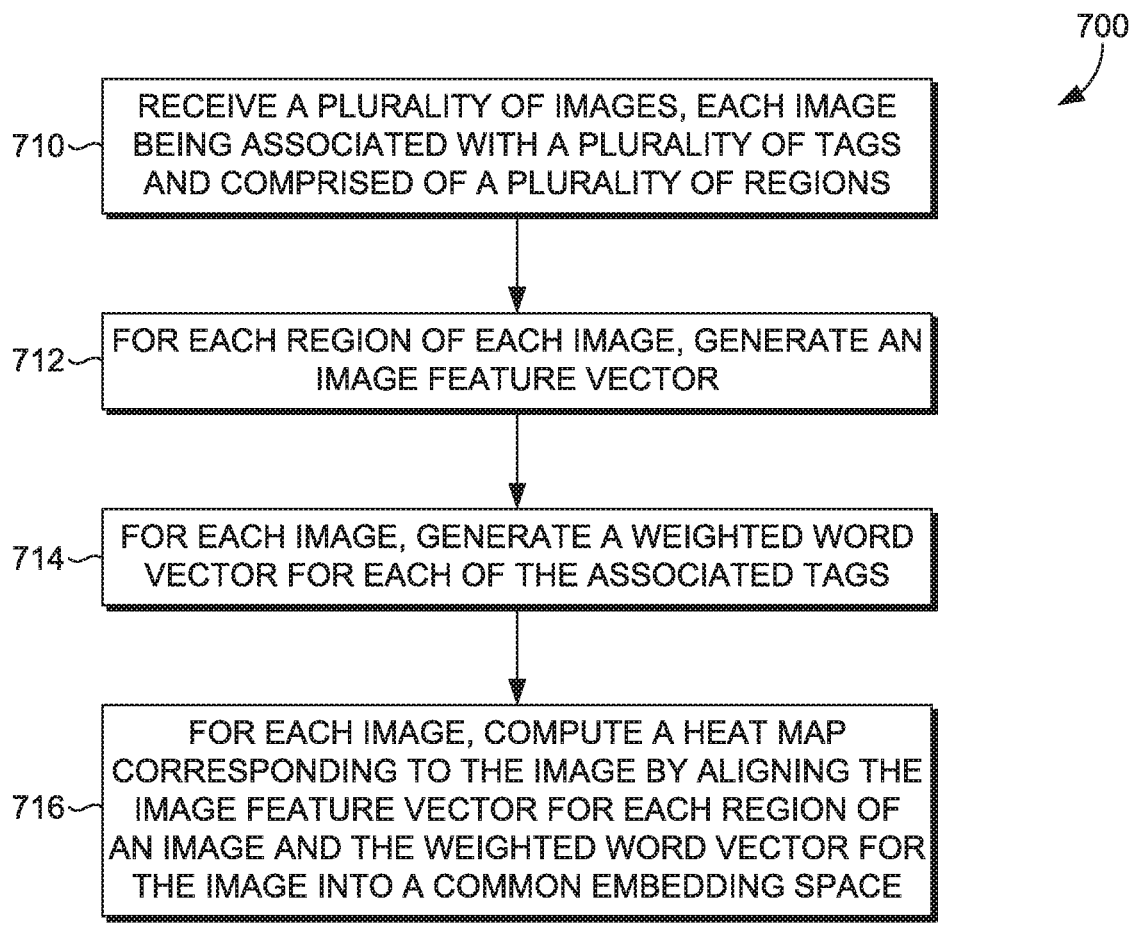
FIG. 7 is a schematic diagram illustrating image-to-tag embedding with topic guidance in accordance with some implementations of the present disclosure.

Turning now to FIG. 7, a flow diagram is shown illustrating an exemplary method 700 for dense image-to-topic embedding in accordance with implementations of the present disclosure. Each block of the method 700 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 710, a plurality of images is received, each image being associated with a plurality of keyword tags and being comprised of a plurality of regions, each region comprising less than the entire image. In embodiments, a sum of the plurality of regions comprising the entire image. In some embodiments, at least a portion of the images are dense images, that is, images having a high resolution and/or otherwise being associated with an abundance of information relative to other images. For each region of each image of the plurality of images, one or more visual features are computed. Visual features may include, by way of example only, lower level features such as lines, curves, etc., and/or higher level features such as shapes, body parts (human or otherwise), and the like. In implementations of the present disclosure, the visual features are computed utilizing a convolutional neural network, a deep network functionality known to those having ordinary skill in the relevant art. As shown at block 712, for each region of the each image, an image feature vector is generated from the one or more visual features.

With respect to the keyword tags, for each image, a word vector representation is generated for each of the associated plurality of tags. In implementations, the word vector representation is generated utilizing Pointwise Mutual Information (PMI). In implementations, PMI is utilized to generate the word vector representation in accordance with Equation 2, set forth above.

As shown at block 714, a weighted average of the generated word vector representations is calculated to generate an image-specific soft topic feature (or weighted word) vector. As previously set forth, a soft topic feature vector represents a coarse summary of the plurality of keyword tags and, as such, identifies a dominant concept contained in the tags associated with the subject image. In implementations, the weighted average is calculated utilizing Equation 3, set forth above. In accordance with exemplary implementations of the present disclosure, the weighted average is calculated utilizing one or more of tag order and inverse document frequency (IDF).

As shown at block 716 the image embedding vectors for each region of the image are aligned with the soft topic feature vector are mapped into a common embedding space such that they are similar to one another. A plurality of regions of the heat map corresponds to the plurality of regions of the image and at least one region of the heat map corresponds to each of the plurality of keyword tags. In implementations, the image embedding vectors for each region and the soft topic feature vector are mapped to the common embedding space utilizing cosine similarity loss in accordance with Equation 4, set forth above.

Figure 8:
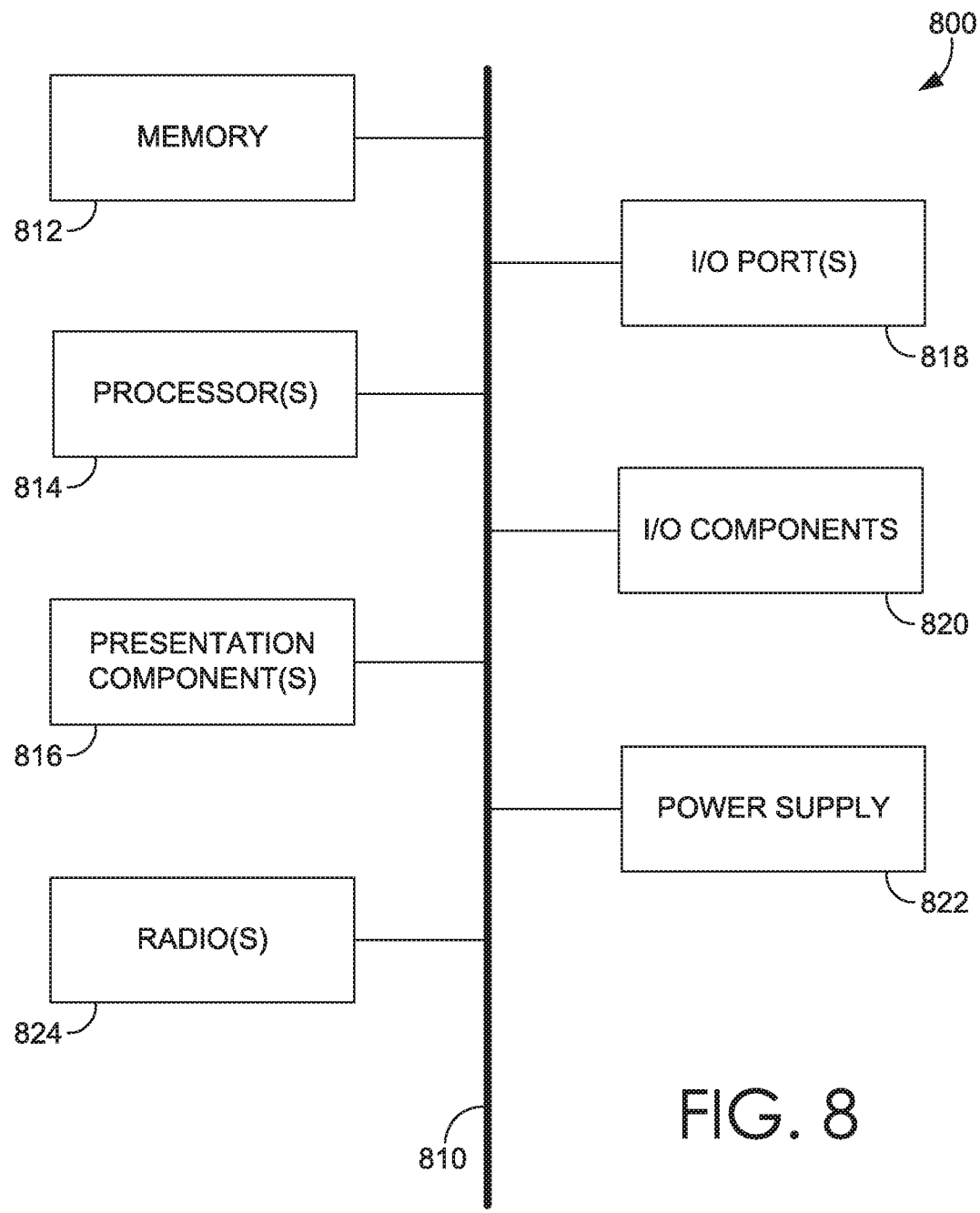
FIG. 8 is a block diagram of an exemplary computing environment suitable for use in accordance with some implementations of the present disclosure.

Having described implementations of the present disclosure, an exemplary operating environment in which embodiments of the present invention may be implemented is described below in order to provide a general context for various aspects of the present disclosure. Referring to FIG. 8, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

As described above, implementations of the present disclosure relate to a framework for associating dense images with topics that are indicative of the subject matter of the images utilizing embedding learning. The framework is trained utilizing multiple images, each image having associated keyword tags. As to the visual information associated with each image, the images include a number of regions. For each region of each image, one or more visual features are computed, an image feature vector is generated from the visual features, and an image embedding vector is generated from the image feature vector. As to the tag information associated with each image, the keyword tags are utilized to generate a soft topic feature vector for each image by calculating a weighted average of word vector representations generated for the tags associated with the image. The image feature vector for each region of a given image and the soft topic feature vector for the image are aligned into a common embedding space and a heat map is computed for the image. The heat map includes multiple regions that correspond to the regions of the image and at least one region of the heat map corresponds to each of the tags. Once trained, the framework described herein can be utilized to automatically tag additional input images and rank the relevance of images and/or image regions with respect to queried keywords based upon associated heat maps.

The present invention has been described in relation to particular embodiments which are intended in all respects to be illustrative rather than restrictive. Alternative embodiments will become apparent to those of ordinary skill in the art to which the present invention pertains without departing from its scope.

The subject matter of the present invention has been described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer system comprising:
   one or more processors; and
   one or more computer storage media storing computer-useable instructions that, when used by the one or more processors, cause the one or more processors to:
   receive a plurality of images, each image of the plurality of images being associated with a plurality of tags and each image of the plurality of images being comprised of a plurality of regions, each region of each image comprising less than an entirety of the image it comprises;
   for each region of each image of the plurality of images, generate an image feature vector from one or more visual features;
   for each image of the plurality of images, generate a weighted word vector from the associated plurality of tags;
   for each image, compute a heat map corresponding thereto by aligning the image feature vector for each region of a given image and the weighted word feature vector into a common embedding space utilizing cosine similarity loss, wherein a plurality of regions of the heat map corresponds to the plurality of regions of the given image and wherein at least one region of the plurality of regions of the heat map corresponds to each of the plurality of tags; and
   provide an image of the plurality of images to be presented based on the computed heat map for the image.

2. The computing system of claim 1, wherein for each image of the plurality of images, the one or more processors are further caused to compute the one or more visual features.

3. The computing system of claim 2, wherein the one or more visual features are computed utilizing a convolutional neural network.

4. The computing system of claim 1, wherein for each image of the plurality of images, the one or more processor are further caused to:
   generate a word vector representation for each of the associated plurality of tags;
   calculate a weighted average of the generated word vector representations to generate the weighted word vector; and
   normalize the weighted word vector in the common embedding space.

5. The computing system of claim 4, wherein the word vector representation for each of the associated plurality of tags is generated utilizing Pointwise Mutual Information.

6. The computing system of claim 4, wherein the weighted average is calculated, at least in part, uniformly for each of the plurality of tags.

7. The computing system of claim 4, wherein the weighted average is calculated, at least in part, utilizing inverse document frequency.

8. The computing system of claim 4, wherein each of the associated plurality of tags is a user-provided tag, and wherein the weighted average is calculated, at least in part, utilizing a tag order in which a first tag of the plurality of associated tags is assigned a greater weight than a second tag of the plurality of associated tags when the first tag is provided by the user before the second tag.

9. The computing system of claim 1, wherein the image feature vectors for each of the plurality of regions collectively comprise a vector map, and wherein the embedded image feature vectors for each of the plurality of regions collectively comprise an image embedding map.

10. The computing system of claim 9, wherein the one or more processors further are caused to:
    pool a local feature vector from the vector map;
    concatenate the local feature vector with an embedded image feature vector for one of the plurality of regions to form a topic-guided feature vector;
    generate a second image embedding vector from the topic-guided feature vector; and compute a second heat map corresponding to the image by aligning the second image embedding vector with the weighted word vector into the common embedding space utilizing cosine similarity loss.

11. A computer-implemented method for tagging images, the method comprising:
- receiving an image associated with a plurality of user-provided tags, the image being comprised of a plurality of regions, each region comprising less than the entire image;
- generating an embedded image feature vector for each of the plurality of regions;
- generating an image-specific weighted word vector from the plurality of user-provided tags;
- computing a first heat map corresponding to the image by aligning the embedded image feature vector for each region of the image and the image-specific weighted word vector into a common embedding space using cosine similarity loss, wherein a plurality of regions of the first heat map corresponds to the plurality of regions of the image, and wherein at least one region of the first heat map corresponds to each of the plurality of user-provided tags; and
- providing the image to be presented based on the computed first heat map.

12. The method of claim 11, wherein generating the embedded image feature vector for each of the plurality of regions comprises:
- computing one or more visual features associated each of the plurality of regions;
- generating an image feature vector associated with each of the plurality of regions from the associated one or more visual features; and
- generating the embedded image feature vector for each of the plurality of regions from the associated image feature vector utilizing a convolutional neural network.

13. The method of claim 12, wherein the image feature vectors for each of the plurality of regions collectively comprise a vector map and wherein the image embedding vectors for each of the plurality of regions collectively comprise an image embedding map.

14. The method of claim 13, further comprising:
- pooling a local feature vector from a particular region of the first heat map utilizing the vector map, the particular region of the first heat map being associated with one of the plurality of user-provided tags;
- concatenating the local feature vector with an image embedding vector for one of the plurality of regions to form a topic-guided feature vector;
- generating a second image embedding vector from the topic-guided feature vector; and
- computing a second heat map corresponding to the image by aligning the second image embedding vector with a soft topic feature vector into the common embedding space utilizing cosine similarity loss.

15. The method of claim 11, wherein generating the image-specific weighted word vector from the plurality of user-provided tags comprises:
- generating a word vector representation for each of the associated plurality of user-provided tags; and
- calculating a weighted average of the generated word vector representations to generate the image-specific weighted word vector.

16. The method of claim 15, wherein the word vector representation for each of the associated plurality of user-provided tags is generated utilizing Pointwise Mutual Information.

17. The method of claim 15, wherein the weighted average is calculated, at least in part, utilizing inverse document frequency.

18. The method of claim 15, wherein the weighted average is calculated, at least in part, utilizing a tag order in which a first tag of the plurality of user-provided tags is assigned a greater weight than a second tag of the plurality of user-provided tags when the first tag is provided by a user before the second tag.

19. A computing system comprising:
- means for generating an image embedding vector for each of the plurality of regions of an image utilizing a convolutional neural network;
- means for generating a soft topic feature vector for the image by calculating a weighted average of a plurality of word vector representations, each of the plurality of word vector representations being generated for a different one of a plurality of tags associated with the image; and
- means for computing a heat map corresponding to the image by aligning the image embedding vector for each region of the image and the soft topic feature vector into a common embedding space utilizing cosine similarity loss, wherein a plurality of regions of the heat map corresponds to the plurality of regions of the image, and wherein at least one region of the heat map corresponds to each of the plurality of tags associated with the image, and wherein the image is provided for presentation based on the computed heat map.

* * * * *